June 6, 1939.  D. G. K. MOSS  2,161,077
NAVIGATIONAL INDICATING INSTRUMENT
Filed Feb. 4, 1937   3 Sheets-Sheet 1
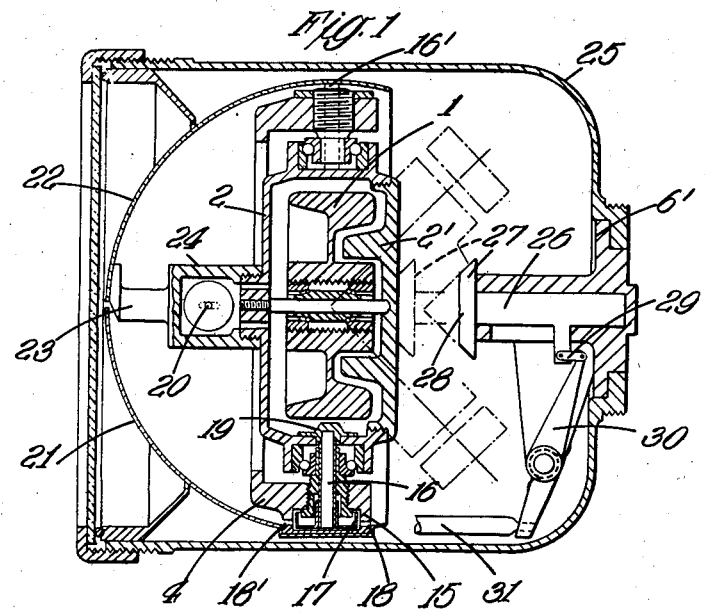
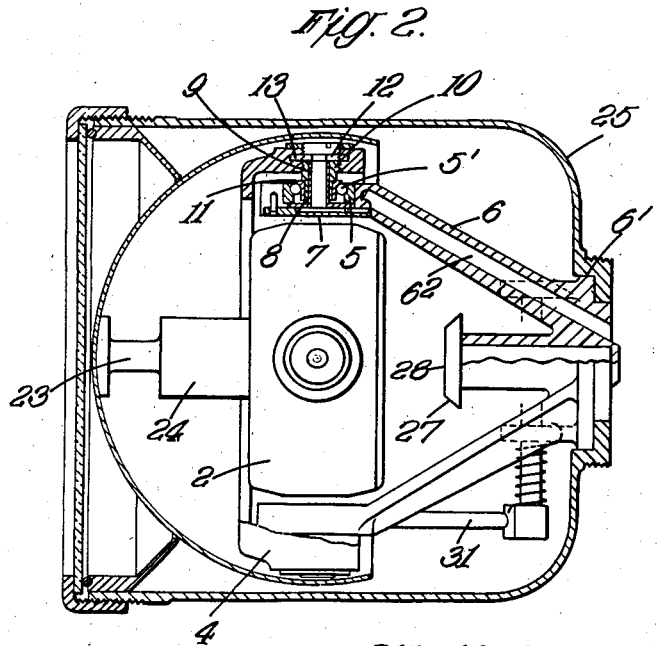
DOUGLAS GEORGE KING MOSS
INVENTOR
By Otto Munk
his Atty.

June 6, 1939.   D. G. K. MOSS   2,161,077
NAVIGATIONAL INDICATING INSTRUMENT
Filed Feb. 4, 1937   3 Sheets-Sheet 2
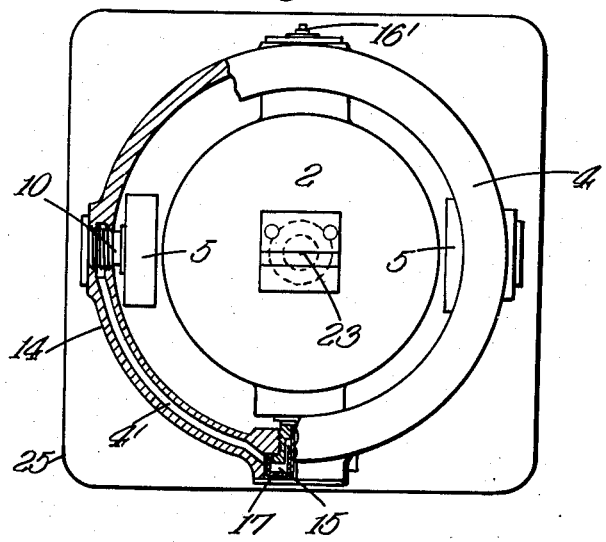
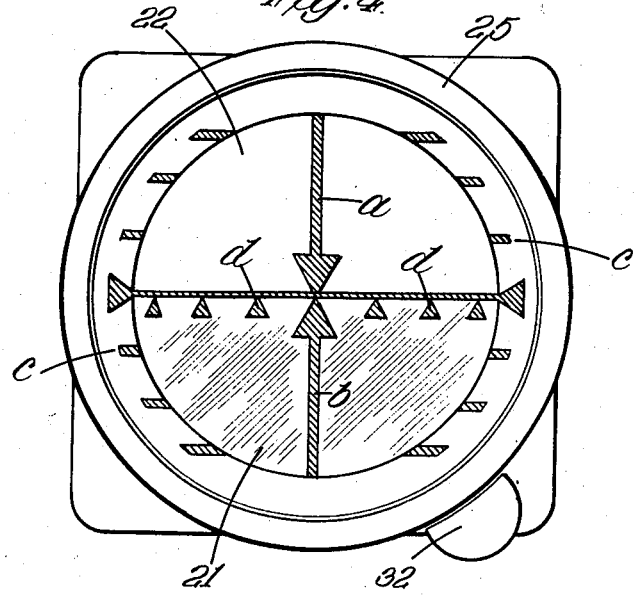
DOUGLAS GEORGE KING MOSS
INVENTOR
By
his Att'y.

June 6, 1939.　　　D. G. K. MOSS　　　2,161,077
NAVIGATIONAL INDICATING INSTRUMENT
Filed Feb. 4, 1937　　　3 Sheets-Sheet 3
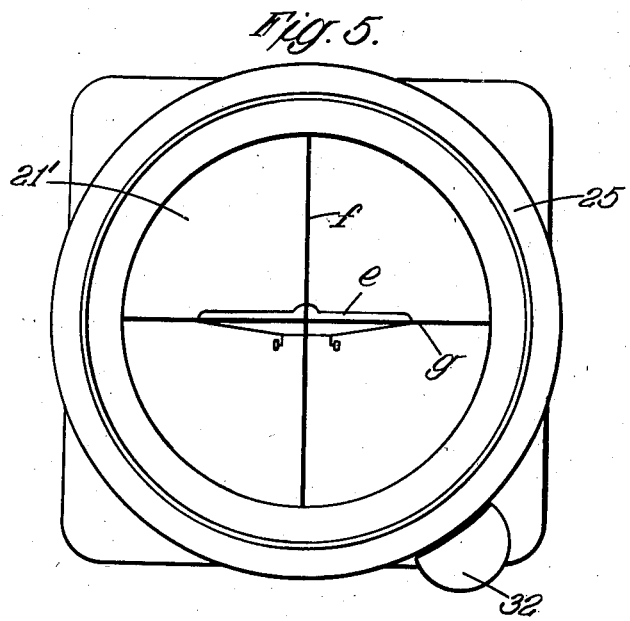
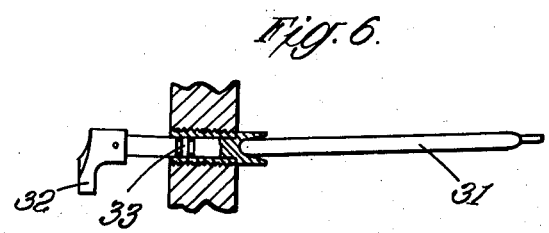
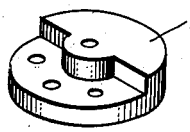
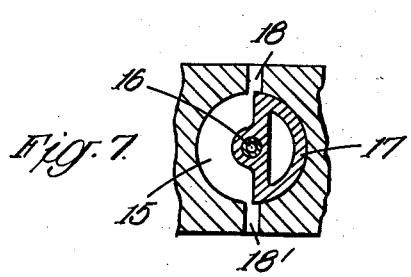
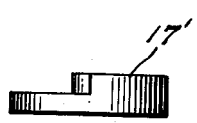
DOUGLAS GEORGE KING MOSS
INVENTOR
By *[signature]*
his Att'y Patented June 6, 1939

2,161,077

UNITED STATES PATENT OFFICE 2,161,077

NAVIGATIONAL INDICATING INSTRUMENT

Douglas George King Moss, Sanderstead, England, assignor to Mechanism Limited, Croydon, England, a limited corporation of Great Britain Application February 4, 1937, Serial No. 124,009
In Great Britain February 12, 1936

9 Claims. (Cl. 33—204)

This invention relates to gyroscopic navigation instruments, more particularly but not exclusively intended for aircraft, giving indications as to the longitudinal inclination of the craft and its movements in azimuth.

Such instruments in themselves are already known, but these instruments are re-erected by devices common to the two readings. These instruments suffer certain disadvantages and the principal object of the present invention is to overcome these disadvantages and to render the use of magnetic erection devices unnecessary and further to make possible a considerable increase in the deflection range in all directions.

Accordingly, the invention consists in a gyroscopic pitch azimuth navigation instrument which is entirely air controlled.

The invention still further consists in an instrument according to the preceding paragraph in which the indications of pitch and azimuth operate independently of one another, and in which either indication may operate alone or both operate together.

The invention yet further consists in an instrument as in either of the preceding paragraphs provided with means for centering the instrument by mechanical means, which means may also be adapted to hold the mechanism stationary when the instrument is not in use.

More particularly the invention comprises a gyro wheel in a casing constituting the inner gimbal rotatably carried by an outer gimbal ring rotatably carried by spaced bearings, and air controlled erecting means associated with each of the gimbals, the air conveniently being led from a common source. Each gimbal may carry a quarter-spherical element for separately and quantitatively indicating pitch and azimuth deviations or the inner gimbal alone may carry a hemispherical element bearing an index or device which will give a qualitative indication of displacement. Means coacting with the gyro wheel casing may also be provided for resetting the instrument to normal.

In order that the invention may be clearly understood and readily carried into effect, the same is hereinafter more fully described with a reference to the accompanying drawings which are given by way of example only and not of limitation.

In these drawings:—

Figure 1 is a sectional side elevation,

Figure 2 is a part sectional plan view,

Figure 3 is a front view with the dials omitted,

Figure 4 is a front view of the complete instrument,

Figure 5 is a front view of another form of instrument,

Figure 6 is a detail view of part of the resetting means,

Figure 7 is a diagram illustrating one of the air valves,

Fig. 8 shows in perspective a modified form of a part of the air valves, and

Fig. 9 is a side elevational view of the device illustrated in Fig. 8.

Referring now to the said drawings, a gyro wheel 1 is rotatably mounted on a horizontal axis in an air-tight casing 2 which constitutes an inner gimbal and which is rotatably mounted on vertical trunnions carried by an outer gimbal ring 4 which is in turn rotatably mounted in spaced bearings 5 on a horizontal axis at right angles to that of the gyro wheel 1, the vertical axis extending through the point of intersection of the horizontal axes. The spaced bearings 5 are supported by converging arms 6 which terminate in a flanged portion $6^1$ which permits attachment thereof to the instrument casing 25. The controlling air enters through the flanged portion $6^1$ and passes through a passage $6^2$ drilled in either or both arms 6 from whence it passes between a cover plate 7 and the flanged end 8 of a hollow spindle 9 a close moving fit in a hollowed portion of the outer gimbal trunnion 10. This trunnion 10 extends through and threadedly engages the outer gimbal ring 4 and has disposed against it the cone 11 of a roller bearing $5^1$. Radial bores 12 are provided in the threaded portion of the trunnion 10 leading from the hollowed portion therein to the outside where they open into an annular recess 13 in the correspondingly threaded portion of the outer gimbal ring 4. This recess is in communication with a channel $4^1$ cut in the outer periphery of the gimbal ring and provided with a cover 14, to convey the air a quarter of the way around this outer gimbal ring 4 into a valve chamber 15 in which means are provided for imparting an erecting torque to the outer gimbal ring. This valve comprises, for example, an annular chamber 15 (Figure 7) through which extends the spindle 16 of the inner gimbal 2 to which is secured a semi-circular flanged element 17 adapted partially to obstruct diametrically oppositely disposed air orifices 18, $18^1$ provided in the wall of the chamber 15. If the inner gimbal 2 is displaced with relation to the outer gimbal ring 4 the orifice areas become unequal due to the rotation of the semi-circular element 17 so causing an unbalance of the emergent air-jets. The action of this unbalance of the air-jets tends to blow the outer gimbal around its pivotal axis, causing the gyro to precess and thereby re-erecting the inner gimbal with respect to the outer gimbal ring. As this re-erection may, in some cases, be too rapid, in a modification the element 17 may take the form of an annular flanged member 17¹ (Fig. 8), the flange of one half being, say, twice as deep as the other, such that the deeper portion, instead of obstructing the orifices by half, now in conjunction with the shallower half obstructs them each by three quarters in normal position as indicated by circle 18 (Fig. 9), representing the orifice shown in Fig. 7. The web of the element 17¹ is provided with one or more apertures extending through the thickness thereof to enable excess air to pass to the opposite side thereof.

The inner gimbal spindle 16 is hollow so that air in the unoccupied half of the chamber 15, or air which has passed through the web of the modified form of element 17, may enter therein and be led thereby to a jet 19 within the gyro casing 2. The air emerging from this jet 19 impinges on the gyro wheel 1 and rotates the same. Finally, the air leaves the gyro casing through a suitable valve, for example, a valve such as is described in U. S. Patent No. 2,036,229, dated April 7, 1936, comprising a rolling body 20 in a casing 24, in communication with the air in the gyro wheel casing 2, in the walls of which are oppositely disposed air exit orifices. Should the gyro spin axis become tilted, the body 20 rolls and by closing and opening the respective orifices creates an unbalance of the emergent air jets which tend to blow the inner gimbal around its pivotal axis and cause precession of the gyro wheel to eliminate the tilt.

The outer gimbal ring 4 carries a quarter-spherical element 21 and a similar element 22 is carried by the inner gimbal 2 being conveniently supported by an extension 23 of the casing 24 of the outlet valve 29 and by an extension of the upper spindle 16¹ of the inner gimbal 2. These two elements abut and are conveniently contrastingly coloured, one being, say, grey, and the other black. Centrally each has an arrow $a$ and $b$ in a different colour to the background and the abutting edges are conveniently lined in the same colour. The upper element 22 being attached to the inner gimbal 2 gives indications of azimuth by its movements relative to the lower element 21 which is attached to the outer gimbal ring 4 and the degree of longitudinal (fore and aft inclination) may be read by the relation of the division between the two quarter-spherical elements to a vertical scale $c$ on the bezel or side of the casing 25. Thus, the movement of the two elements together gives indications of pitch and the degree of azimuth movement or yaw may be read by lateral movement of the arrow $a$ on the upper element 22 against scale marks $d$ provided on the visible edge of the lower element 21. In this way, quantitative readings may be obtained.

The embodiment of the invention shown in Fig. 5 is particularly useful in cases where an easily discerned qualitative reading is required. For this purpose, instead of the quarter-spherical elements, a hemispherical element 21¹ is provided having, say, a central marking $e$, for example, in the form of an end view of an aeroplane, the movements of which with relation to suitable datum marks, lines or wires $f$ and $g$ attached to the instrument casing, or the front glass, give the required indication of both pitch and azimuth. In this case, the hemispherical element 21¹ will, of course, be carried by the inner gimbal 2, being supported in like manner to the semi-hemispherical element 21 previously described.

Should it be desired to restore the instrument to normal quickly, a spring loaded plunger 26 having a chamfered head 27 is provided and arranged to move towards the gyro casing 2 under mechanical urge and away therefrom under the action of the spring. The forward movement of the plunger 26 causes the chamfered portion of its head 27 to engage the displaced gyro casing indicated by chain lines and by sliding thereon restore it to normal position, the action being completed by the flat end 28 of the head 27 in the position shown in broken lines. The plunger 26 is connected by a link 29, lever 30 and rod 31 to a push-button 32 disposed on the front of the instrument casing 25 and this button may be adapted to be held depressed to prevent relative movement of the instrument parts when the instrument is not in use. Thus, spring urged balls or other means may engage the recesses 33 to hold the parts against return movement by the plunger spring after the push-button 32 has been depressed. This plunger head 27 also acts as a limiting stop to the gimbal movement. If the instrument has reached its limit of movement, in any direction, and the craft is further inclined, it is only necessary for the pilot to press the button to reset the instrument to normal in order to note the further inclination. The button may also be operated quickly to restore the instrument to normal after a turn or other movement.

To compensate for the weight of the element 22, one side of the gyro wheel 1 is made heavier than the other and the side 2¹ of the gyro casing 1 is thickened to add weight to that side.

The invention is not limited to the embodiments described above as modifications may be made therein without departing from the invention, for example, other air-controlled erecting means may be used in place of those described and the executional details may be varied as required.

I claim:

1. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis in a predetermined normal relation with respect to said inner gimbal, air chambers carried by said inner and outer gimbals, respectively, means for differentially opening and closing a set of oppositely directed air exit orifices in the air chamber of said inner gimbal, said means being controlled by tilting about the horizontal axis of said outer gimbal for causing said gyro to precess and eliminate said tilt, and means for differentially opening and closing a set of oppositely directed air exit orifices in the air chamber of said outer gimbal, the latter means being controlled by relative movement of said gimbals about said vertical pivots for precessing said gyro to restore said inner gimbal to said predetermined relation with respect to said outer gimbal.

2. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis in a predetermined normal relation with respect to said inner gimbal, a quarter-spherical element carried by said outer gimbal, a quarter-spherical element carried by said inner gimbal adjacent said first-mentioned quarter-spherical element and in matched relation so that the two normally define a hemisphere, air jet means on said inner gimbal controlled by tilting about the horizontal axis of said outer gimbal for causing said gyro to precess and eliminate said tilt, and air jet means on said outer gimbal controlled by relative movement of said gimbals about said vertical pivots for precessing said gyro to restore said inner gimbal to said predetermined relation with respect to said outer gimbal.

3. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis in a predetermined normal relation with respect to said inner gimbal, a dial carried by said inner gimbal, crossed index lines disposed in front of said dial, an index mark on said dial adapted to give qualitative indications of displacement with respect to said crossed index lines, air jet means on said inner gimbal controlled by tilting about the horizontal axis of said outer gimbal for causing said gyro to precess and eliminate said tilt, and air jet means on said outer gimbal controlled by relative movement of said gimbals about said vertical pivots for precessing said gyro to restore said inner gimbal to said predetermined relation with respect to said outer gimbal.

4. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis, air controlled means for erecting said inner and outer gimbals about the horizontal gimbal axis, a valve chamber in said outer gimbal having oppositely directed air exit orifices adapted to apply torques about said horizontal gimbal axis in opposite directions, respectively, and an element in said chamber rotatable by said inner gimbal and adapted to differentially open and close said orifices for opposite directions of relative rotation, respectively.

5. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis in a predetermined normal relation with respect to said inner gimbal, a valve chamber carried by said inner gimbal and having oppositely directed air exit orifices adapted to apply torques about said vertical pivots in opposite directions, respectively, a rolling body in said chamber adapted on displacement to differentially open and close said orifices, and air controlled means for applying torque to the gyroscope about said horizontal gimbal axis on relative movement of said rings about said vertical axis to cause the gyro to precess, thereby moving the inner gimbal into predetermined relation with respect to said outer gimbal.

6. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis, a valve chamber carried by said inner gimbal and having oppositely directed air exit orifices adapted to apply torques about said vertical pivots in opposite directions, respectively, a rolling body in said chamber adapted on displacement, due to inclination of the gimbals about said horizontal axis, to differentially open and close said orifices, a valve chamber in said outer gimbal having oppositely directed air exit orifices adapted to apply torques about said horizontal pivots in opposite directions, respectively, and an element in said last mentioned valve chamber rotatable by said inner gimbal and adapted to differentially open and close said orifices when said inner gimbal becomes displaced with respect to the outer gimbal about said vertical pivots.

7. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis, a quarter-spherical element carried by said outer gimbal, a quarter-spherical element carried by said inner gimbal, adjacent said first-mentioned quarter-spherical element, and in matched relation so that the two normally define a hemisphere, a valve chamber in said outer gimbal having oppositely directed air exit orifices adapted to apply torques about said horizontal pivots in opposite directions, respectively, an element in said chamber rotatable by said inner gimbal and adapted to differentially open and close said orifices when said inner gimbal becomes displaced with respect to said outer gimbal about said vertical pivots, a valve chamber carried by said inner gimbal and having oppositely directed air exit orifices adapted to apply torques about said vertical pivots in opposite directions, respectively, a rolling body in said last-mentioned chamber adapted on displacement due, to inclination of the gimbals about said horizontal axis, to differentially open and close said orifices, and manually operable spring-urged plunger provided with chamfered head having a flat end, adapted when operated to engage said gyro casing and by sliding thereon push it back to normal position.

8. In a gyroscopic pitch azimuth navigational instrument, an inner gimbal carrying a gyro wheel having a normal horizontal spin axis, an outer gimbal to which said inner gimbal is pivoted by normally vertical pivots, spaced bearings supporting said outer gimbal on a horizontal axis at right angles to said gyro wheel axis, a dial carried by said inner gimbal, crossed index lines in front of said dial, an index mark on said dial adapted to give qualitative indications of displacement with respect to said crossed index lines, a valve chamber in said outer gimbal having oppositely directed air exit orifices adapted to apply torques about said horizontal pivots in opposite directions, respectively, an element in said chamber rotatable by said inner gimbal and adapted to differentially open and close said orifices when said inner gimbal becomes displaced with respect to said outer gimbal about said vertical pivots, a valve chamber carried by said inner gimbal and having oppositely directed air exit orifices adapted to apply torques about said vertical pivots in opposite directions, respectively, a rolling body in said last-mentioned chamber adapted on displacement, due to inclination of the gimbals about said horizontal axis, to differentially open and close said orifices, and manually operable spring-urged plunger provided with a chamfered head having a flat end, adapted when operated to engage said gyro casing and by sliding thereon push it back to normal position.

9. A gyroscopic pitch azimuth navigational instrument as claimed in claim 8, in which the controlling air is led from a common source through a hollow bearing, one of the outer gimbal pivots and a channel in the outer gimbal to an inner gimbal pivot containing said valve chamber in the outer gimbal, hence through a hollow spindle into the inner gimbal to drive the gyro wheel and is then discharged through the valve chamber carried by the inner gimbal.

DOUGLAS GEORGE KING MOSS.